March 25, 1958  M. E. ALTERS  2,827,914
VALVE SHUT OFF BOX
Filed March 3, 1955  2 Sheets-Sheet 1
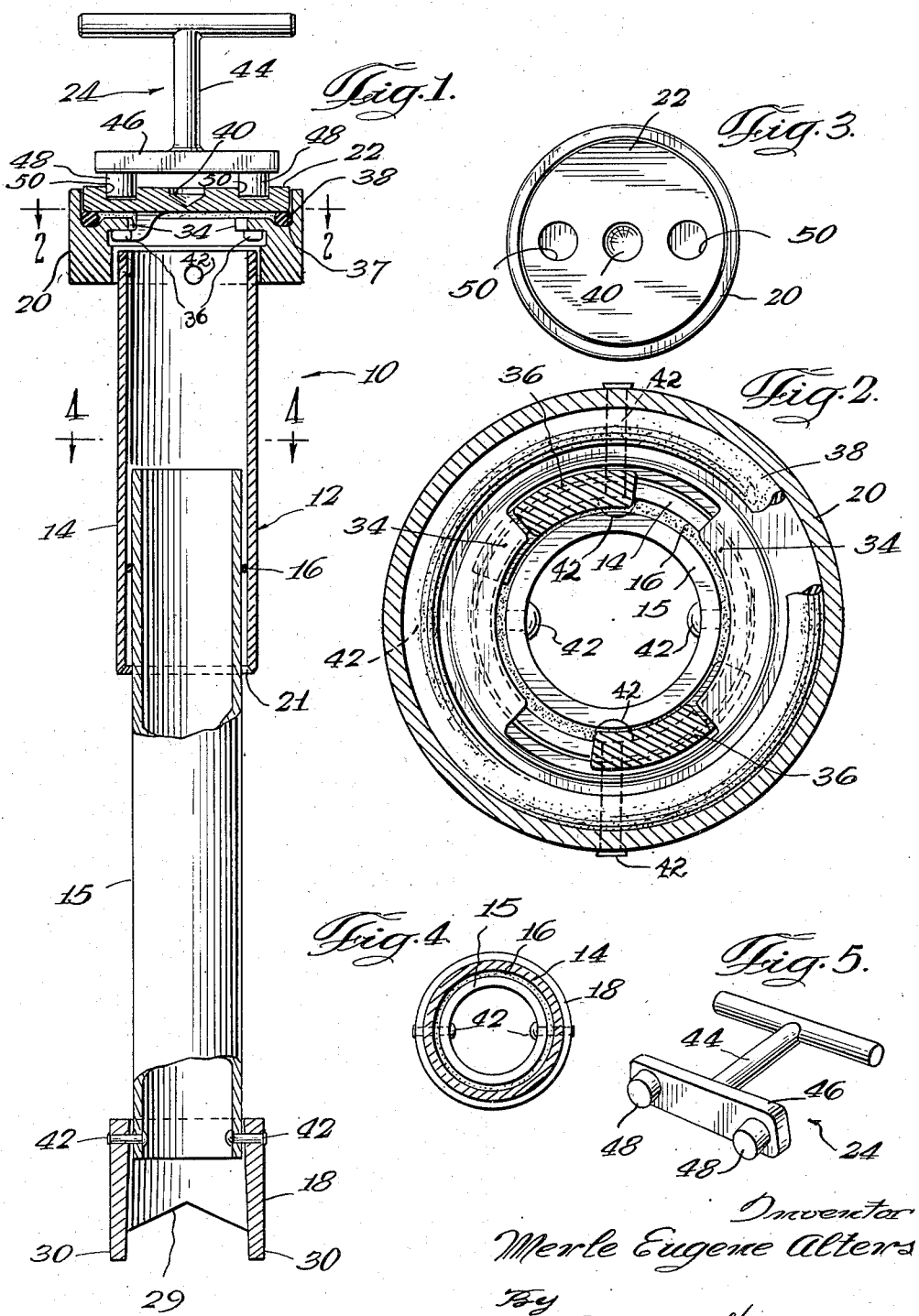
Inventor
Merle Eugene Alters
By
Mann, Brown & Hausmann
Attorneys

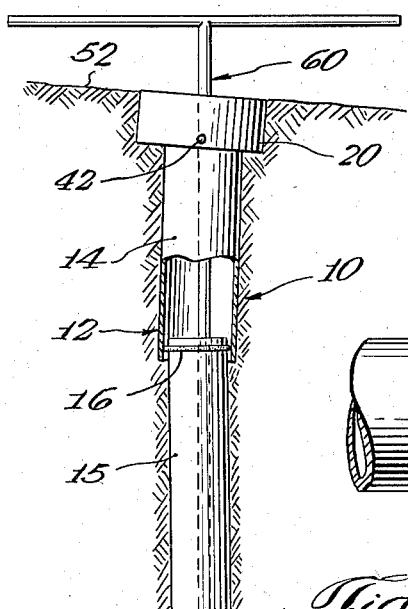
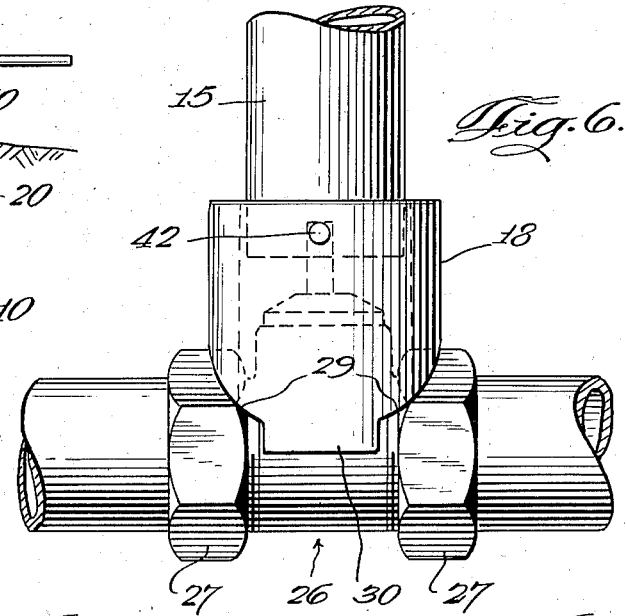
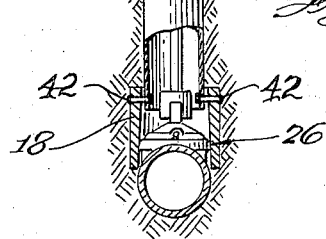
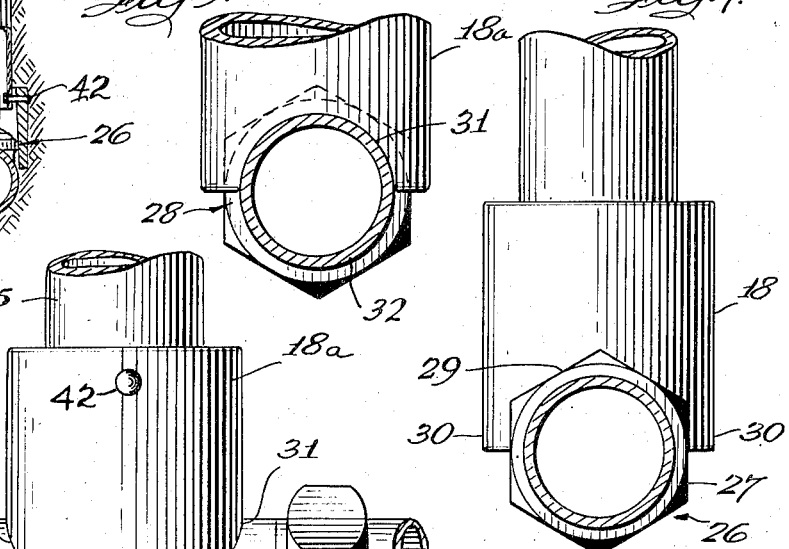
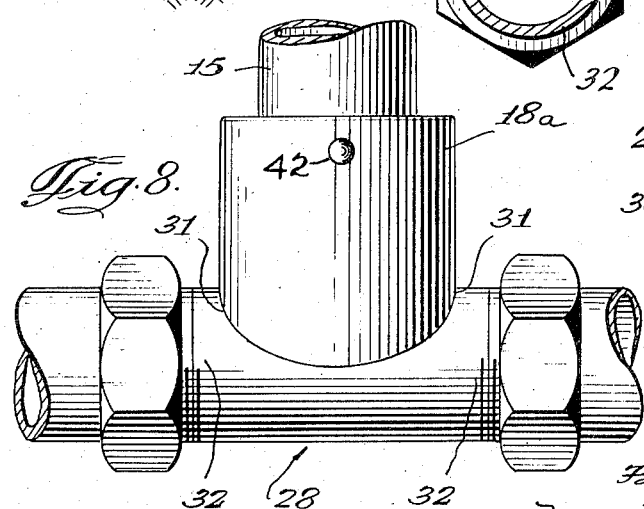

United States Patent Office 2,827,914
Patented Mar. 25, 1958

2,827,914
VALVE SHUT OFF BOX

Merle Eugene Alters, Beloit, Wis.

Application March 3, 1955, Serial No. 491,965

6 Claims. (Cl. 137—364)

My invention relates to a valve shut off box, and more particularly to a curb valve box or tube adapted to be positioned between an underground valve for gas lines or the like and the ground surface for providing access to the valve.

Conventional valve shut off boxes for providing access to underground valves in gas conduits and the like are so constructed that little or no adjustment is possible to allow for variations in depth at which the valves may be located. Consequently, it is necessary to keep on hand a relatively large selection of curb boxes to provide for all possible situations. Obviously, this is a relatively expensive proposition.

Moreover, no provision is made for leveling the top or cap of conventional boxes with the ground surface with the result that when conventional valve shut off boxes are positioned where the ground surface has a marked slope, at least one edge of the box top or cap protrudes above the ground surface thereby forming a dangerous protrusion and unduly exposing the box to rough treatment.

The pricipal object of the present invention is to provide a valve shut off box which is adjustable in height and which has a flat cap that may be leveled with the ground surface regardless of the slope of said surface.

A further object of the invention is to provide a valve shut off box comprising one or more relatively simple tubular elements which may be formed by simply cutting conventional pipe stock to the proper length.

Yet another object of the invention is to provide a valve shut off box including two or more telescoping elements held in adjustable telescoping relation by resilient sealing means which sealing means not only allows adjustment of the telescoping elements with respect to each other, but which also provides a satisfactory sealing action during the entire usable life of the box.

In accordance with the illustrated embodiments of the present invention, I provide a valve shut off box for an underground valve comprising a pair of telescoping tubular members separated by an O-ring seal. A collar is secured to the upper end of the upper tubular member for limited pivotal movement about an axis normal to the longitudinal axis of said upper member, and another collar is secured to the lower end of the lower tubular member for the same type of pivotal movement. Preferably, the axes of pivotal movement of the two collars are disposed perpendicular to each other. The upper collar is provided with a relatively flat cap for closing the box, which cap is adapted to be engaged by a tool for removing same from the collar thereby providing access to the valve shut-off key. The lower collar is positioned over the shut-off key of the valve while the valve remains uncovered. As earth is being filled over the valve and around the box, the various elements of the box may be adjusted so that the cap is level with the surface of the ground at the end of the installing procedure.

Other objects, uses and advantages will be obvious or become apparent from a consideration of the following description and drawing figures.

In the drawings:

Figure 1 is a longitudinal sectional view, partially in elevation, of a preferred embodiment of the invention and a tool for applying and removing the box cap;

Figure 2 is a sectional view along line 2—2 of Figure 1;

Figure 3 is a plan view of the top of the device with the tool removed;

Figure 4 is a sectional view along line 4—4 of Figure 1;

Figure 5 is a perspective view of a tool for applying and removing the box cap;

Figure 6 is an elevational view showing one form of the invention applied to one type of valve;

Figure 7 is a side elevation of the device shown in Figure 6;

Figure 8 is a front elevational view of another form of the invention applied to another form of valve;

Figure 9 is a side elevation of the device shown in Figure 8; and

Figure 10 is an elevational view, partially in section, showing the invention applied to an underground valve and a conventional tool applied to the valve shut-off key through the box.

Referring now more particularly to the drawings, wherein like references are employed to designate like parts, reference numeral 10 of Figure 1 generally indicates a preferred form of the invention including tube 12 comprising a pair of telescoping tubular member forming tubular elements 14 and 15 separated by an O-ring seal 16, a collar 18 pivotally connected to the lower end of the lower tubular element 15 and a collar 20 pivotally connected to the upper end of the upper tubular element 14. The upper collar 20 is provided with a relatively flat cap 22 adapted to be removed from the upper collar 20 by employing the tool generally indicated at 24 in Figures 1 and 5.

The tubular elements 14 and 15 comprising the tube 12 may have any desired cross-sectional configuration, but are preferably formed from conventional pipe stock by merely cutting desired widths of pipe into suitable lengths. These elements of the invention in practice may be formed in the field by cutting pipe stock kept on hand for this purpose, and by using conventional pipe cutters. Two lengths of pipe differing sufficiently in diameter are employed, so that these elements will telescope as shown in Figure 1 with enough space left between the elements to compressingly accommodate O-ring seal 16. As the elements 14 and 15 are pressed into telescoping relationship with the seal 16 positioned therebetween, the seal is rolled into sealing engagement with both of the elements. The element 14 may be chamfered somewhat as indicated at 21 in Figure 1 to aid in the assembly process, if so desired.

The relationship between the O-ring, the outer surface of the element 15 and the inner surface of the element 14 is such that while the O-ring is compressed between them, only sufficient compressive forces are employed to create the sealing effect required. As shown in the drawings, the O-ring is slightly flattened where it engages the surface of the pipe elements, which provides a substantial sealing effect. However, the compressive forces acting on the O-ring material with this arrangement are nominal.

Collars 18 and 20, and cap 22 of the illustrated embodiments are preferably cast elements, they being formed out of any suitable materials which will withstand extended exposure. The lower collar 18, which may be termed a stand pipe, is received over the shut-off key of the particular valve installed, for instance, valve 26 of Figures 6 and 7 or the valve 28 of Figures 8 and 9. Preferably the lower end of the collar 18 is formed to substantially sealingly or shieldingly engage the valve around the valve key to prevent loose earth and the like from collecting around and obstructing operation of the valve shut-off key.

In Figures 6 and 7, the valve is of a type wherein the nuts 27 will be positioned close to the valve key; in the embodiment of the invention particularly adapted to be applied to this valve, the lower end of collar 18 is formed at each side thereof with a notch 29 shaped to engage the hex nuts 27 as indicated in Figure 1. Thus, the collar 18 of Figures 1, 6 and 7 will fit over and rest on the nuts 27, as shown in Figure 6, with the projections 30 on either side of the collar engaging the valve body. It will be seen that this arrangement results in the valve key being substantially covered or shielded by the collar 18 which precludes access of earth or the like to the valve key.

In Figures 8 and 9, the valve is of a type having relatively long arms 32; for engagement with this type of valve, the lower end of collar 18a is formed with round notches 31 for engaging the outer surface of the arms 32 as shown in Figure 9.

The upper collar 20 is preferably formed with a pair of spaced lugs 34 adapted to be engaged by hooked lugs 36 carried by the cap 22. Outwardly of the lugs 34 the collar 20 is formed with a groove 37 adapted to receive O-ring seal 38 which is engaged and compressed by the lower surface of cap 22 to seal the open end of the tube when the cap is applied to the box. The cap 22 is preferably formed with an indentation 40 for readily drilling a vent when a vent is desirable and with a pair of recesses 50 for receiving a tool as hereinafter described.

The collars 18 and 20 are respectively pivotally secured to the lower end of the lower element 15 and the upper end of the upper element 14 by pairs of suitable rivets or the like pin means 42. As shown in Figure 1, the internal diameters of the illustrated collars are somewhat larger than the outside diameters of the tubular elements to which the respective collars are telescopingly secured, which allows limited pivotal movement of the collars about axes generally perpendicular to the longitudinal axis of the tube 10. Also, limited universal pivotal movement of the tubular elements 14 and 15 with respect to each other, with the O-ring 16 as a fulcrum, is provided.

Tool 24 is of a type particularly adapted to remove the cap 22. The tool may comprise a T-shaped handle 44 rigidly fixed to a bar 46 having studs 48 adapted to fit into corresponding recesses 50 formed in the cap.

Figure 10 illustrates the invention in practical use. The tube 12 extends from the underground valve, for instance, valve 26, to the surface 52 of the ground, which surface is shown as having an appreciable slope. The collar 18 engages the valve 26 in the manner described above, and the various elements forming the tube are adjusted with respect to each other to allow the upper edge of the collar 20, and the upper surface of cap 22, to be positioned flush or level with the sloped surface 52. Since the relatively flat upper surface of the cap is substantially level with the upper edge of the collar 20, said surface and said upper edge will not protrude above the surface of the ground when these elements are aligned with the ground surface as indicated in Figure 10. Thus, the collar 20 and the valve box as a whole do not present the dangerous and highly undesirable protrusion that necessarily results when conventional valve boxes are installed in sloping ground.

Preferably the elements 14 and 15 are telescoped in such a manner that the rivets or the like 42 securing the collar 18 to the element 15 are generally perpendicular to the rivets or the like 42 securing the collar 20 to the element 14 (see Figure 2). By so doing, the collars have limited pivotal movement about axes which are substantially perpendicular to each other, and thus provide a universal joint effect, which is accentuated by the limited universal pivotal action of the elements 14 and 15 about the seal 16. Thus, for any particular installation, the elements comprising the tube 12 may be adjusted through a relatively wide range for insuring that the upper surface of cap 22 is flush or level with the ground surface. It will be appreciated that the relatively flat upper surface of the cap provides an excellent bearing surface for persons or vehicles in the event that the valve box is to be positioned in areas having congested pedestrian or vehicular traffic.

The valve shut-off key of, for instance, valve 26, is operated by removing the cap 22 and applying a conventional tool 60 to the key, as indicated in Figure 10. The cap 22 is removed by fitting studs 48 of tool 24 in recesses 50 in the cap, and twisting the cap in the appropriate direction. The lugs of the cap may be formed to open upon either a left or right hand twist by the tool 24, but ordinarily left hand twist is desirable, as in the form shown in the drawings, since most people attempting unwarranted or unlicensed access to the valve box will assume that the cap has a right hand twist, and will assume that the cap is stuck when it does not open when a right hand twist is applied. The tool indicated at 24 is especially designed for use with the cap 22, but any suitable tool having rigidly spaced lugs comparable to lugs 48 will be satisfactory.

Valve boxes provided according to the invention have a simplified and inexpensive construction and are readily adapted to a variety of installation conditions. It will be noted that no screw-threading is employed or required. The size of the stand pipe element 15 will vary according to the size of valve shut-off keys employed in different valves.

The foregoing description and the drawings are given merely to explain and illustrate my invention, and the manner in which it may be performed, and the invention is not to be limited thereto, except insofar as the appended claims are so limited since those skilled in the art who have my disclosure before them will be able to make modifications and variations therein without departing from the scope of the invention.

I claim:

1. A valve shut off box for an underground valve comprising a tube adapted to be positioned in the ground and extend between the valve and the surface of the ground, said tube comprising a tubular member having upper and lower ends, a tubular collar telescopingly received over said upper end of said member, pin means pivoting said collar to said upper end for pivotal movement with respect thereto about an axis perpendicular to the central axis of said member, a tubular collar telescopingly received over said lower end of said member, pin means pivoting the last mentioned collar to said lower end of said member for pivotal movement with respect thereto about an axis perpendicular to the central axis of said member, and which is disposed substantially normally of the axis of pivotal movement of the first mentioned collar, said collars being larger in internal width than the external thickness of the respective ends of said member, a relatively flat cap for said first mentioned tubular collar, the inner surface of said first mentioned tubular collar being formed with a plurality of spaced inwardly projecting lugs and said cap being formed with a plurality of spaced laterally projecting lugs depending from said cap and positioned to engage under the lugs of said first mentioned collar when moved toward them, said lugs of said first mentioned collar being spaced apart sufficiently to permit said lugs of said cap to pass between them when said cap is applied or removed from said first mentioned collar, said cap being formed to be engaged by a tool for rotating same with respect to said first mentioned collar about the central axis thereof, and having a relatively flat upper surface, the lower end of said last mentioned collar being formed to engage the valve, whereby said tubular member may be pivoted with respect to said last mentioned collar and said first mentioned collar may be pivoted with respect to said tubular member to provide a limited universal joint like adjustment for said cap.

2. The valve shut off box set forth in claim 1 wherein said tubular member comprises an upper tubular element, a lower tubular element having its upper end telescopingly received within the lower end of said upper tubular element, with the internal width of said upper tubular element at its lower end being larger than the external thickness of said lower tubular element at its upper end, and wherein an O-ring seal is sealingly interposed between said ends of said elements.

3. The valve shut off box set forth in claim 2 wherein said lower end of said last mentioned collar is formed to engage hex nuts positioned adjacent said valve.

4. The valve shut off box set forth in claim 2 wherein said lower end of said last mentioned collar is formed to engage the cylindrical surface of the valve.

5. The valve shut off box set forth in claim 2 wherein said elements are formed from lengths of standard pipe stock.

6. The valve shut off box set forth in claim 2 wherein said first mentioned collar is formed with a generally horizontal surface about the tubular opening defined thereby, wherein said cap is formed with a surface positioned to overlie said surface of said first mentioned collar when said cap is applied to said first mentioned collar, and including an O-ring seal received between said surfaces of said first mentioned collar and said cap.

References Cited in the file of this patent

UNITED STATES PATENTS

| | | |
|---|---|---|
| 307,558 | Lindsley et al. | Nov. 4, 1884 |
| 343,933 | Walker | June 15, 1886 |
| 349,567 | Clarke | Sept. 21, 1886 |
| 604,622 | Lobdell et al. | May 24, 1898 |
| 1,038,963 | Roe | Sept. 17, 1912 |
| 2,691,384 | Mueller et al. | Oct. 12, 1954 |